Nov. 16, 1954     A. E. RICHEY     2,694,600
LAWN SPRINKLER STAND
Filed May 12, 1952
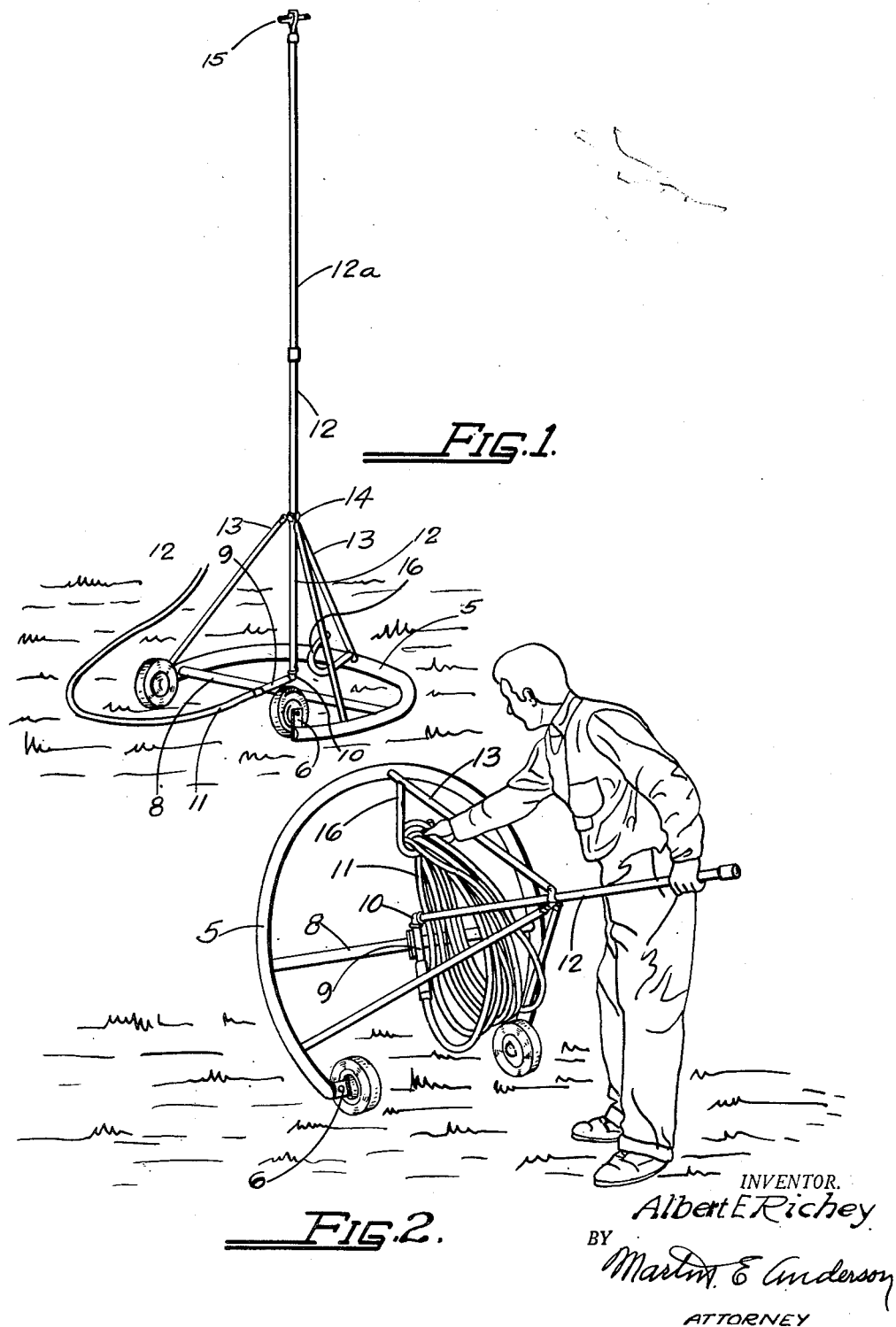
INVENTOR.
Albert E Richey
BY Martin E Anderson
ATTORNEY United States Patent Office 2,694,600
Patented Nov. 16, 1954

2,694,600
LAWN SPRINKLER STAND

Albert E. Richey, Colorado Springs, Colo.

Application May 12, 1952, Serial No. 287,445

2 Claims. (Cl. 299—47)

This invention relates to improvements in lawn sprinklers and has reference more particularly to a stand for supporting an ordinary rotary or spray sprinkler at a considerable elevation above the ground.

There are on the market a large variety of sprinklers some of which are of the reaction type having radially extending nozzles that are rotated by the reactive force of the emerging water stream and others that emit a fine spray.

Such sprinklers, unless they are supported at a considerable height above the surface to be irrigated, cover only a comparatively small area and must therefore be frequently moved.

It is the object of this invention to produce a sprinkler support or stand of such construction that it can readily be moved over the lawn surface and which will support the sprinkler at a considerable height above the surface of the lawn so that the water will cover a large area.

Another object is to produce a stand of a simple and substantial construction that shall be provided with wheels on which it will be supported while it is moved from one place to another.

A further object is to produce a stand that shall be of such a design that it can be manufactured with the use of simple and inexpensive tools and with a minimum amount of labor and which can therefore be marketed at a moderate price.

The above and other objects that may become apparent as the description proceeds are attained by means of a construction and an arrangement of parts that will now be described in detail for which purpose reference will be had to the accompanying drawing in which the invention has been illustrated and in which Figure 1 is a perspective view showing the stand as it appears when in use and Figure 2 is a perspective view showing the position of the stand during the moving thereof.

In the drawing reference numeral 5 designates the base which comprises a pipe curved about a center to form a C-shaped circular arc of substantially 270 degrees having a gap or opening as shown. Attached to the ends of the base are brackets 6 to which rubber tired wheels 7 are rotatably connected. The relationship of the parts are such that the wheels have a common axis of rotation. The wheels are so positioned that they do not project below the plane of the lower surface of the base and the base therefore rests on a plane surface throughout its entire length. The wheels are so positioned that when the stand is tipped into the position shown in Figure 2 the entire weight of the stand will be supported by the wheels and the stand can therefore be moved from place to place in the manner of a two wheeled cart, as shown in Figure 2.

A tubular brace or bar 8 extends across the base in the line parallel with a diameter positioned a short distance from the center between the center and the ends of the base forming a chord, which is parallel with a chord joining the ends of the base. Pipe 8 is welded to the base.

A short pipe 9 is welded in perpendicular relation to the upper surface of member 8 and terminates in an elbow 10 that is preferably positioned at the center point of the base. The other end of pipe 9 has means for effecting a connection with a hose 11. A pipe 12 has its lower end connected with elbow 10 and extends vertically or perpendicularly to the plane of the base. At least three braces 13 extend from the base and have their lower ends welded thereto. The upper ends of the braces are connected to the pipe 12 at point 14 by some suitable connector or they may be welded to pipe 12. Pipe 12 may be extended upwardly to any desired height by adding other pipe sections such as 12a. The sprinkler has been designated by numeral 15 and may be of any suitable kind. A hook 16 is welded to one of the braces 13 and serves as a support for hose when the stand is moved, as illustrated in Figure 2.

It will be apparent that when a sprinkler of the rotary reaction type or of the spray type is supported in the elevated position shown it will irrigate an area much greater than it would if it were standing on the ground and large lawns such as parks may therefore be irrigated with less labor as the time spent in moving the sprinklers will be greatly reduced. The base is preferably made from iron pipe as it must have considerable weight to give it stability but pipe 12a must be of aluminum or other light material.

Particular attention is directed to the C-shaped base with the wheels attached thereto as shown as this provides means for conveniently moving the stand and also serves to hold it steady during the sprinkling operation.

Having described the invention what is claimed as new is:

1. A stand for supporting a lawn sprinkler in an elevated position, comprising a circular C-shaped base having a bar extending across the same, parallel to a chord connecting the ends of the base and between said chord and the center of the base, a pipe having its lower end provided with an angle pipe coupling for effecting connection with a water carrying hose, the pipe and coupling being supported by said bar, the pipe projecting upwardly from the center of the base in a direction substantially perpendicular to the plane of the base, at least three braces having their lower ends welded to the base at angularly spaced points and their upper ends connected with the pipe serving to hold the pipe in a predetermined vertical position with respect to the plane of the base, wheel supporting brackets attached to the ends of the base and projecting upwardly therefrom, and wheels carried by the brackets for rotation about a common axis, the axis of rotation being positioned above the plane of the lower surface of the base a distance at least as great as the radius of the wheels whereby the base may rest with its entire under surface in contact with a plane supporting surface.

2. A device in accordance with claim 1 in which one of the three braces is connected with the base at a point diametrical opposed to the middle point of a chord connecing the ends of the base and the other two braces are connected to the base adjacent its ends.

References Cited in the file of this patent

UNITED STATES PATENTS

| Number | Name | Date |
|---|---|---|
| D. 130,351 | Hunt | Nov. 11, 1941 |
| 1,780,351 | Brickhill | Nov. 4, 1930 |
| 1,903,085 | Barnes | Mar. 28, 1933 |
| 2,434,140 | Bernstein | Jan. 6, 1948 |
| 2,455,729 | Byers | Dec. 7, 1948 |
| 2,555,722 | Wilkie | June 5, 1951 |

FOREIGN PATENTS

| Number | Country | Date |
|---|---|---|
| 252 | Great Britain | of 1874 |
| 128,083 | Great Britain | June 19, 1919 |